Nov. 2, 1954   M. GRUNT   2,693,338
VALVE
Filed May 5, 1950

INVENTOR.
Max Grunt,
BY
Flocks and Simon
ATTORNEYS

2,693,338
VALVE

Max Grunt, Newark, N. J.

Application May 5, 1950, Serial No. 160,311

4 Claims. (Cl. 251—340)

This invention relates to a stop valve and more particularly to an improvement in valves used to control the flow of fluid in a line.

The valve constructions now in use for the most part have a solid valve plug attached to the end of a valve stem. When the valve plug is unseated, fluid is permitted to flow around the periphery of the plug between the valve seating surface and the plug. The pressure of the fluid along with any impurities therein contribute to the rapid wearing away of the plug seating surface and the valve seat.

This invention has as an object to provide a simple, effective and easily-manipulated valve for a pipe line or the like.

A further object of the invention is to provide a valve arrangement permitting a longer life for the valve plug and valve seat.

A still further object of the invention is to provide a valve arrangement wherein the valve plug is made up of a plurality of parts, adapted to fit together to seat tightly on the valve seat.

A still further object of the invention is to provide a valve arrangement wherein the valve plug is adapted to be separated when in the open position so as to permit the flow of fluid through the valve plug.

Other objects and the nature and advantages of the instant invention will be apparent from the following description taken in conjunction with the accompanying drawings, wherein.

Figure 1:
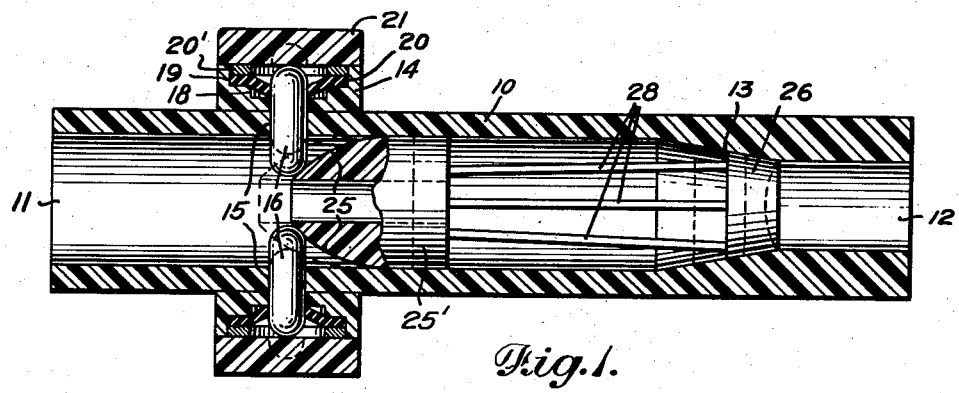
Fig. 1 is a sectional view of the valve in closed position, showing the valve in open position in dotted lines.
Figure 2:
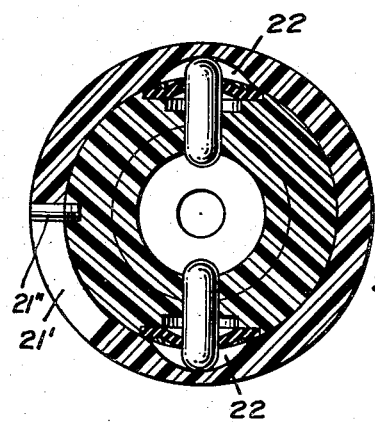
Fig. 2 is a sectional view of the valve in open position taken along the line II—II of Fig. 1.
Figure 3:
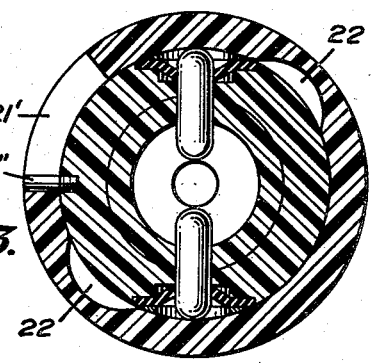
Fig. 3 is a similar view to that shown in Fig. 2 showing the valve in closed position.

Referring to the drawings and more particularly to Fig. 1, the reference numeral 10 refers to the valve body which is cylindrical in shape and has a passageway extending therethrough. The diameter of the passageway is greater at the outlet end 11 than at the inlet end 12, and a tapered valve seat 13 is provided which gradually increases from the inlet diameter 12 to the outlet diameter 11 thereof. The valve body is provided with a narrow ring 14 surrounding it at a point downstream from the valve seat 13 that is immovably attached thereto. A pair of aligned holes 15 are provided extending completely through the ring 14 and the body 13 at opposite sides thereof. The holes 15 act as bearing surfaces for a pair of round ended pins 16 which are adapted to move vertically in the holes. Surrounding each of the holes 15 on the outer surface of the ring 14 is an indented portion 18. A shoulder 19 is provided in the side wall of the indented portion which is adapted to receive the outer periphery of a gasket 20 resting thereon. The gasket 20 has an opening at the center thereof which tightly grips the pin 16 to prevent leakage of the fluid flowing through the valve body 10. A ring 20′ is placed over the periphery of the gasket 20 to hold the gasket tightly onto the shoulder 19. A rotating ring 21 is placed around the stationary ring 14 and is adapted to be rotated with respect thereto. A slot 21′ is provided through a portion of the ring 21 centrally of the width thereof to receive a pin 21″ which is threaded into the stationary ring 14. The pin 21″ acts as a stop to limit the extent of rotation of the ring 21 and prevent its removal during normal operation. A pair of grooves 22 are provided in the inner surface at opposite sides of the rotating ring 21. The grooves 22 are shaped to receive the outer rounded ends of the pins 16 when the valve is in the open position as shown in Fig. 2. The grooves are so shaped that upon rotation of the ring with respect to the valve body and the pins, the outer ends of the pins will ride out of the grooves and rest on the inner periphery of the ring as best shown in Fig. 3. The gaskets 20 are flexible and when the pins are in their outermost position as in Fig. 2, the gaskets will be flexed outwardly; however, when the pins are in their innermost position as in Fig. 3, the gaskets will be flexed inwardly.

The valve body 10, ring 14 and rotatable ring 21 are preferably made of a transparent material such as glass or plastic, although metal can be used if desired.

The inner rounded ends of the pins 16 come in contact with a rounded head 25 of a valve plug assembly 25′. The head is provided with a passageway therethrough for the flow of fluid. The head 25 has a slightly smaller outer diameter than the diameter of the passageway at the outlet end of the valve body so that it can reciprocate therein. The valve plug 26 is composed of a plurality of sectors 27 or any other shaped sections adapted to fit together to form a body of frustro conical shape which fits tightly against the valve seat 13. The sectors 27 of the valve plug are each urged outwardly by a flexible arm 28, attached at one end to the flat inner surface of one of the sectors 27 and at the other end to the flat face of the head 25. As illustrated, there are provided three sectors 27 forming the valve plug 26; however there may be any number of sectors. The valve plug is preferably made of a resilient material which can be slightly compressed. When assembled, the head 25, flexible arms 28 and the valve plug 26 form an integral structure which can be inserted into the valve body 10 from the outlet end 11 thereof. The entire assembly is adapted to move laterally with respect to the valve body.

The assembly of the valve is extremely simple. After the valve plug assembly 25′ has been inserted into the valve body 10, the round ended pins 16 are inserted through the gaskets 20, and the rotatable ring 21 is assembled thereon. The valve is now ready for insertion in a pipe line.

Figure 4:
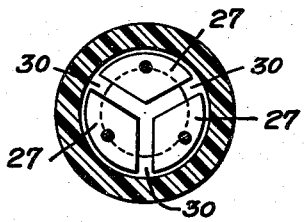
Fig. 4 is a sectional view of the valve plug in open position taken along the line IV—IV of Fig. 1.

The operation of the valve is likewise extremely simple. The valve is actuated by rotation of the rotating ring 21. When in the closed position, as in Fig. 3, the outer ends of the pins 16 are in contact with the inner diameter of the ring 21, and the inner ends of the pins are in contact with the rounded head 25 of the valve plug assembly 25′ forcing it against the pressure of the fluid at the inlet end 12 so that the valve plug is tightly seated on the valve seat 13 preventing the flow of fluid. When the ring 21 is rotated until the grooves therein are brought into alignment with the outer ends of the pins, the pressure of the fluid on the valve plug will force the valve plug assembly outwardly from the valve seat, and the head 25 thereof will force the pins outwardly into the grooves 22. As the valve plug is forced away from the valve seat, the sectors 27 of the valve plug are urged outwardly by the flexible arms 28 thus separating one from another to provide passageways 30 between the sectors as shown in Fig. 4 for the passage of fluid. The outer peripheries of the sectors 27 will be maintained in engagement with the valve seat 13 as the assembly moves to the left, and due to the enlarging taper of the valve seat the sectors will no longer be in contact with one another along their adjacent radii. The gaskets 20 tightly engage the pins 16 and thus prevent the escape of fluid from the valve body 10.

In place of the long tapered valve seat 13, the valve seat could be relatively short with an enlargement in the diameter of the valve body adjoining the valve seat downstream therefrom. The enlargement in the valve body could be in the form of a spherical portion against which the sectors of the valve proper could be urged.

Figure 5:
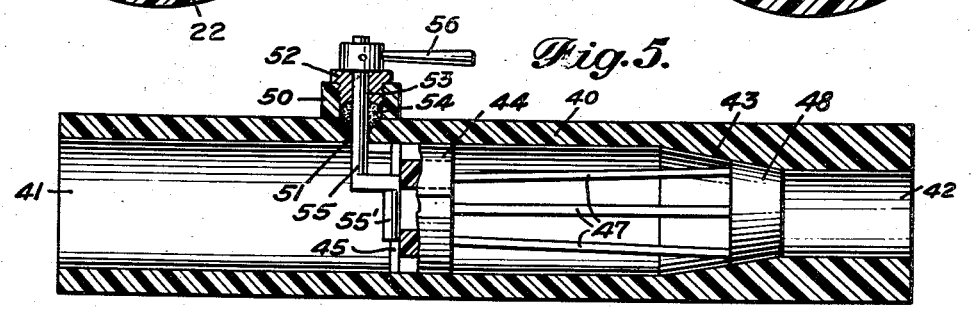
Fig. 5 is a sectional view of a modified form of the invention.
Figure 6:
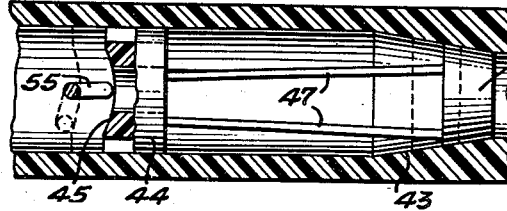
Fig. 6 is a sectional view of the form of the invention shown in Fig. 5 in closed position taken along the line VI—VI of Fig. 5, showing the valve in open position in dotted lines.

The modification of the invention illustrated in Figs. 5 and 6 differs from that heretofore described in the means for actuating the valve. A valve body 40 is shown which has a passageway therethrough of greater diameter at the outlet end 41 than at the inlet end 42. The two diameters are joined by a tapering valve seat 43. The valve plug assembly which is adapted to reciprocate in the valve body comprises a head 44 having a curved downstream surface 45 and a flat upstream surface 46. The curved downstream surface 45 curves inwardly in a vertical plane as shown in Fig. 6 and is adapted to act as a bearing surface for a crank member to be described hereafter. The head has a plurality of openings extending therethrough for the flow of fluid. A plurality of flexible arms 47 are each attached at one end to the head 44 and at the other end to one of the sectors 48, a plurality of which constitute the valve plug. The sectors 48 may each constitute one-third of a circle, or may be of any number and shape which fit together to form the plug of frustro conical shape which seats into the valve seat to prevent the flow of fluid. The sectors are each urged outwardly against the valve seat by the flexible arms 47, so that as the assembly is moved to the left, the sectors follow the tapered valve seat and are thus separated one from another to permit the flow of fluid between the sectors. By means of these passageways between the sectors and the openings through the plug member, the flow of fluid is directed to the central part of the valve body. An internally threaded boss 50 is securely attached to the outer surface of the valve body 40 downstream from the valve seat 43 surrounding an opening 51 in the valve body. A plug 52 having a central opening 53 therein is threaded into the boss 50. A gasket 54 is inserted within the opening in the boss 50 between the plug 52 and the valve body. A crank 55 extends through the openings in the plug 52, the gasket 54 and the valve body, which act as a bearing surface permitting rotation of the crank. A handle 56 is attached to the end of the crank extending outside of the valve body. The lower arm of the crank 55' within the valve body bears against the curved surface 45 of the head 44 of the valve plug assembly, so that upon rotation of the crank from the dotted line to the full line position shown in Fig. 6, the valve plug assembly is moved to the right so that the valve sectors seal the valve seat tightly to shut off the flow of fluid in the pipe line.

The valve body 40 is preferably made from a transparent material such as glass or plastic, although metal can be used if desired.

In operation, when the flow of fluid is to be shut off, the crank handle is turned to the position shown in Fig. 5 so that the lower arm 55' of the crank forces the valve plug assembly to the right. In this position, the sectors are forced tightly together as well as against the valve seat to completely seal the opening. Upon rotation of the crank, the pressure of the fluid in the pipe line will force the valve plug assembly to the left. The plug member is always in engagement with the crank. Upon movement of the valve plug assembly to the left, the flexible arms 47 will force the sectors outwardly against the valve seat so that as the valve seat becomes larger, the sectors will be separated one from another permitting flow of the fluid between the sectors and thence through the openings in the head.

It will be obvious to those skilled in the art that various changes may be made without departing from the spirit of the invention and therefore the invention is not limited to what is shown in the drawings and described in the specification but only as indicated in the appended claims.

I claim:
1. In a fluid flow control device, a valve body having a fluid inlet and a fluid outlet, a valve seat formed in said valve body adjacent said fluid inlet, a valve plug disposed in said valve body, said valve plug including a plurality of sections fitting together to form a body of frusto-conical shape, said body being adapted to fit tightly against said valve seat, a plurality of flexible arms, each of which is secured at one end to the inner surface of a corresponding section and at the other end to the head of said valve plug, said flexible arms urging said sections outwardly to provide for the flow of fluid therebetween, and actuating means engaging the head of said plug for urging said plug in engagement with said valve seat, said actuating means including a pair of oppositely disposed pins extending through said valve body and adapted to be moved in a direction perpendicular to the flow of fluid therethrough, thereby moving said sections inwardly to diminish the flow of fluid through said valve body.

2. In a fluid flow control device, a valve body having a fluid inlet and a fluid outlet, a valve seat formed in said valve body adjacent said fluid inlet, a valve plug disposed in said valve body having a tapered head formed thereon located adjacent said fluid outlet, said valve plug comprising a plurality of sections fitting together to seat tightly on said valve seat, and actuating means comprising oppositely disposed pins extending through said valve body and engaging said tapered head, said pins being moved inwardly against said tapered head for urging said plug in a direction toward the fluid inlet for diminishing the flow of fluid through said valve body.

3. In a fluid flow control device, a valve body having a fluid inlet and a fluid outlet, a valve seat formed in said valve body adjacent said fluid inlet, a valve plug disposed in said valve body having a tapered head formed thereon located adjacent said fluid outlet, said valve plug including a plurality of sections of sector shape fitting together to form a body of frusto-conical shape, a plurality of flexible arms each of which is secured at one end to the inner surface of a corresponding section and at the other end to the head of said valve plug, said flexible arms urging said sections outwardly to provide for the flow of fluid therebetween, and actuating means engaging said plug for urging said plug in engagement with said valve seat, said actuating means including a pair of oppositely disposed pins extending through said valve body and adapted to be moved in a direction perpendicular to the flow of fluid therethrough, thereby moving said sections inwardly to diminish the flow of fluid through said valve body.

4. In a fluid flow control device, a valve body, a valve seat formed in said valve body, a valve plug received by said seat, said plug having a tapered head formed thereon, actuating means engaging said tapered head for moving said valve plug toward said valve seat, said actuating means comprising oppositely disposed pins, extending through said valve body and adapted to be moved in a direction perpendicular to the flow of fluid through said valve body.

References Cited in the file of this patent

UNITED STATES PATENTS

| Number | Name | Date |
|---|---|---|
| 127,743 | Cunningham | June 11, 1872 |
| 132,617 | Allen | Oct. 29, 1872 |
| 726,249 | Brachhausen | Apr. 28, 1903 |
| 734,505 | Brachhausen | July 28, 1903 |
| 746,107 | Kuhn | Dec. 8, 1903 |
| 948,850 | Fegley | Feb. 8, 1910 |
| 1,170,813 | Hennessy | Feb. 8, 1916 |
| 1,185,585 | Bower | May 30, 1916 |
| 1,407,098 | Stichler | Feb. 21, 1922 |
| 1,470,197 | Ryther | Oct. 9, 1923 |
| 1,953,637 | Smith | Apr. 3, 1934 |
| 2,334,395 | Dowell | Nov. 16, 1943 |

FOREIGN PATENTS

| Number | Country | Date |
|---|---|---|
| 23,507 | Great Britain | 1898 |
| 109,741 | Great Britain | 1917 |